3,090,810
BENZYL THIOUREAS
Arthur Berger, Skokie, and Edeltraut E. Borgaes, Chicago, Ill., assignors to Baxter Laboratories, Inc., Morton Grove, Ill., a corporation of Delaware
No Drawing. Filed Jan. 11, 1961, Ser. No. 81,940
10 Claims. (Cl. 260—552)

The present invention relates to novel organic thioureas. More particularly, it relates to ring substituted benzyl thioureas of the formula:

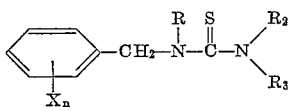

in which X is a member of the group consisting of halogen and lower alkyl, $n$ is an integer from 1 to 3, R is selected from the group consisting of hydrogen and methyl, $R_2$ is selected from the group consisting of alkyl and allyl, $R_3$ is selected from the group consisting of hydrogen and lower alkyl.

The novel compounds of the present invention possess unusual properties which render them useful in novel applications. These compounds generally show considerable central nervous system depressant activity in animals making them promising candidates in the search for anticonvulsants, sedative and tranquilizing agents. In addition, these compounds generally exhibit anti-mycotic activity making them useful against various microorganisms such as *Candida albicans*, *Trichophyton mentagrophytes* and *Microsporum audouini*.

The synthesis of the benzyl thioureas is usually effected by reacting equimolar quantities of the substituted amine with an isothiocyanate in the presence or absence of a solvent such as an alcohol, benzene or the chlorinated solvents. This reaction may be diagrammed as follows:

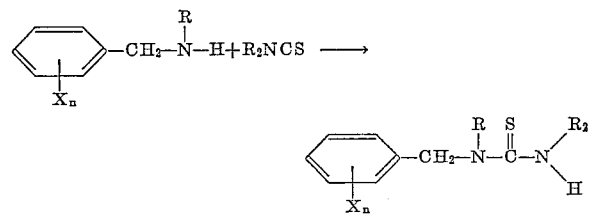

where the symbols X, $n$, R, and $R_2$ are as previously described.

It is also possible to prepare the novel compounds of the present invention by reacting the appropriate amine with a substituted benzyl isothiocyanate with or without solvents. This reaction may be diagrammed as follows:

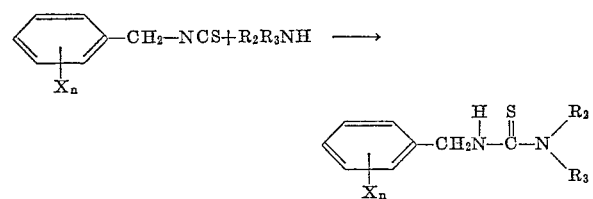

When no solvent is used care must be exercised because the reaction is usually very vigorous. Occasionally cooling in ice is desirable to keep the reaction under control. Either the amine may be added to the isothiocyanate or vice versa without affecting the yield which is usually very high. If a solvent is employed it may be desirable to reflux the mixture to bring the reaction to completion.

Isolation of the novel compounds is usually quite simple as the novel thioureas generally crystallize out upon cooling. If, however, the thiourea does not crystallize, it usually may be readily obtained in solid form by partially or completely removing the solvent. A single recrystallization is usually then sufficient to provide material of high purity.

Illustrative of the variety of alkyl and halogen substituted benzylamines which may be used in the preferred method of preparing the compounds of the present invention are 4-isopropylbenzylamine, 2-chlorobenzylamine, 2-bromobenzylamine, 4-chloro - N - methylbenzylamine, 4-chlorobenzylamine and the like. Representatives of the alkyl and allyl isothiocyanates that may be used in such preparation are ethyl isothiocyanate, methyl isothiocyanate, allyl isothiocyanate and the like. These reactants are generally available commercially or may be made by standard processes: Organic syntheses, Coll. Vol. III, 599, John Wiley and Sons, Inc. (1955).

The following examples will further serve to illustrate the present invention.

EXAMPLE I

*1-Ethyl-3(4-Isopropylbenzyl)-2-Thiourea*

To 7.5 g. (0.05 mole) of 4-isopropylbenzylamine was slowly added 4.4 g. of ethyl isothiocyanate. There was an immediate vigorous reaction and on cooling and scratching the product solidified. The product was recrystallized from isopropyl ether to which a small amount of petroleum ether had been added. The yield was 10.9 g. (92% of the theoretical) of 1-ethyl-3(4-isopropylbenzyl)-2-thiourea (a white solid M.P. 90–1°).

EXAMPLE II

*1-(2-Bromobenzyl)-3-Methyl-2-Thiourea*

To 1.8 g. (0.025 mole) of methyl isothiocyanate was slowly added 4.6 g. (0.025 mole) of 2-bromobenzylamine, the reaction mixture being cooled in an ice-bath to cut down the vigor of the reaction. The product first came out as a viscous liquid but addition of isopropyl ether and scratching converted it to a yellow solid. The solid was recrystallized from benzene and washed with isopropyl ether yielding 5.1 g. (79% of the theoretical) of 1-(2-bromobenzyl)-3-methyl-2-thiourea (a white solid M.P. 114–5°).

EXAMPLE III

*1-(2-Methylbenzyl)-3-Methyl-2-Thiourea*

To 14.7 g. (0.21 mole) of methyl isothiocyanate was added dropwise with cooling, 25.5 g. (0.21 mole) of 2-methylbenzylamine. A vigorous reaction resulted and after cooling and addition of a small amount of methanol, the viscous liquid solidified. After 2 recrystallizations from ethanol, 29.3 g. (72% of the theoretical) of 1-(2-methylbenzyl)-3-methyl-2-thiourea, a white solid, M.P. 134–5° was obtained.

EXAMPLE IV

*1-(2-Fluorobenzyl)-3-Methyl-2-Thiourea*

To 7.3 g. (0.1 mole) of methyl isothiocyanate in 15 ml. of absolute alcohol was slowly added 12.5 g. (0.1 mole) of 2-fluorobenzylamine. After addition was complete the mixture was heated under reflux for 5 minutes, then cooled in an ice-bath. The product solidified and was recrystallized from benzene or methanol-water. The white solid obtained was 1-(2-fluorobenzyl)-3-methyl-2-thiourea weighing 13.0 g. (66% of the theoretical), M.P. 94–5°.

EXAMPLE V

*1-(2-Chlorobenzyl)-3-n-Octyl-2-Thiourea*

To 6.5 g. (0.05 mole) of a stirred solution of n-octylamine in an ice-bath was slowly added 9.2 g. (0.05 mole) of 2-chlorobenzyl isothiocyanate. A vigorous reaction occurred and after it subsided the mixture was cooled and scratched with a glass rod which caused it to solidify. All efforts to recrystallize the material failed. For purification the material was dissolved in acetic acid, carbon treated and precipitated by addition to ice. The solid was washed with petroleum ether and dried. A yield of 14.4 g. (92.4% of the theoretical) of 1-(2-chlorobenzyl)-3-n-octyl-2-thiourea (an off-white solid M.P. 44–6°) was obtained.

EXAMPLE VI

1-(2-Chlorobenzyl)-3,3-Dimethyl-2-Thiourea

To 18.4 g. (0.1 mole) of 2-chlorobenzyl isothiocyanate was slowly added 19.7 ml. (0.1 mole) of 25 percent dimethylamine in water. Reaction was instantaneous and vigorous and no further heating was required. On cooling the product solidified and was collected on a filter. It was recrystallized from a mixture of benzene and n-butanol. The very light yellow solid 1-(2-chlorobenzyl)-3,3-dimethyl-2-thiourea, M.P. 190–2° that was obtained weighed 14.2 g. (62% of the theoretical).

EXAMPLE VII

1-(4-Chlorobenzyl)-1,3-Dimethyl-2-Thiourea

To 3.7 g. (0.05 mole) of methyl isothiocyanate in 10 ml. of absolute alcohol was slowly added 7.8 g. (0.05 mole) of 4-chloro-N-methylbenzylamine. An immediate reaction occurred and on cooling the product solidified. It was collected on a filter and recrystallized from isopropyl ether, then washed with petroleum ether. The white solid, 1-(4-chlorobenzyl)-1,3-dimethyl-2-thiourea after drying weighed 10.1 g. (88.6% of the theoretical yield), M.P. 72–4°.

EXAMPLE VIII

1-Allyl-3(4-Chlorobenzyl)-2-Thiourea

To 7.1 g. (0.05 mole) of 4-chlorobenzylamine in 10 ml. of absolute alcohol was slowly added 5 ml. (slight excess) of allyl isothiocyanate. The reaction was immediate and on cooling a soft yellow product was obtained. All attempts to recrystallize the material were unsuccessful. After being spread on filter paper to dry it could be collected as a solid. It was purified by dissolving in glacial acetic acid, treatment with carbon and precipitation from ice water. The collected solid 1-allyl-3(4-chlorobenzyl)-2-thiourea was washed with petroleum ether yielding 7.1 g. (59.2% of the theoretical) of an off-white solid, M.P. 63–5°.

EXAMPLE IX

1-(2-Chlorobenzyl)-3-Methyl Thiourea

A mixture of 36.5 g. (0.5 mole) of methyl isothiocyanate in 25 ml. of absolute alcohol was added dropwise to 71.0 g. (0.5 mole) of 2-chlorobenzylamine in 75 ml. of absolute alcohol. There was sufficient heat of reaction to cause the alcohol to reflux and after complete addition the mixture was heated for 30 minutes under reflux. After cooling to room temperature a solid crystallized out. It was collected on a filter and purified by crystallization from methanol. The yield of white needles of 1-(2-chlorobenzyl)-3-methyl-2-thiourea was 99.4 g. (92.6% of the theoretical) melting at 123.4°.

Employing the methods described in the above examples, the following compounds were likewise prepared.

TABLE I.—CHLOROBENZYL THIOUREA SERIES $ClC_6H_4CH_2NR_1CSNR_2R_3$

| Position of Cl on ring | $R_1$ equals | $R_2$ equals | $R_3$ equals | Melting point, °C. | Molecular formula | Calculated | | | Found | | |
|---|---|---|---|---|---|---|---|---|---|---|---|
| | | | | | | C | H | N | C | H | N |
| 2 | H | $CH_3$ | H | 123–124 | $C_9H_{11}ClN_2S$ | 50.34 | 5.16 | 13.05 | 50.22 | 5.09 | 12.71 |
| 2 | H | $C_2H_5$ | H | 113–114 | $C_{10}H_{13}ClN_2S$ | 52.51 | 5.73 | 12.25 | 52.63 | 5.91 | 12.50 |
| 2 | H | n-$C_3H_7$ | H | 49–52 | $C_{11}H_{15}ClN_2S$ | 54.42 | 6.23 | 11.54 | 54.52 | 6.25 | 11.35 |
| 2 | H | iso-$C_3H_7$ | H | 137–138 | $C_{11}H_{15}ClN_2S$ | 54.42 | 6.23 | 11.54 | 54.40 | 6.44 | 11.35 |
| 2 | H | n-$C_4H_9$ | H | 37–39 | $C_{12}H_{17}ClN_2S$ | 56.12 | 6.67 | 10.91 | 56.03 | 6.76 | 10.80 |
| 2 | H | iso-$C_5H_{11}$ | H | 43–45 | $C_{13}H_{19}ClN_2S$ | 57.65 | 7.07 | 10.34 | 57.68 | 7.32 | 10.36 |
| 2 | H | n-$C_8H_{17}$ | H | 44–47 | $C_{16}H_{25}ClN_2S$ | 61.41 | 8.05 | 8.95 | 62.04 | 8.36 | 8.91 |
| 2 | H | Allyl | H | 47–49 | $C_{11}H_{13}ClN_2S$ | 54.88 | 5.44 | 11.64 | 54.58 | 5.58 | 11.91 |
| 2 | H | $CH_3$ | $CH_3$ | 190–192 | $C_{10}H_{13}ClN_2S$ | 52.51 | 5.73 | 12.25 | 52.64 | 5.73 | 12.13 |
| 2 | $CH_3$ | $CH_3$ | H | 65–66 | $C_{10}H_{13}ClN_2S$ | 52.51 | 5.73 | 12.25 | 52.61 | 5.75 | 12.25 |
| 2 | $CH_3$ | n-$C_4H_9$ | H | 79–80 | $C_{13}H_{19}ClN_2S$ | 57.65 | 7.07 | 10.34 | 57.59 | 7.15 | 10.31 |
| 2 | H | 2-$ClC_6H_4CH_2$ | H | 129–130 | $C_{15}H_{14}Cl_2N_2S$ | 55.39 | 4.34 | 8.61 | 55.70 | 4.51 | 8.49 |
| 4 | H | $CH_3$ | H | 108–109 | $C_9H_{11}ClN_2S$ | 50.34 | 5.16 | 13.05 | 50.91 | 5.33 | 13.20 |
| 4 | H | n-$C_4H_9$ | H | 90–91 | $C_{12}H_{17}ClN_2S$ | 56.12 | 6.67 | 10.91 | 56.50 | 6.74 | 10.90 |
| 4 | H | Allyl | H | 63–65 | $C_{11}H_{13}ClN_2S$ | 54.88 | 5.44 | 11.64 | 54.85 | 5.21 | |
| 4 | $CH_3$ | $CH_3$ | H | 72–74 | $C_{10}H_{13}ClN_2S$ | 52.51 | 5.73 | 12.25 | 52.46 | 5.88 | 12.38 |
| 4 | $CH_3$ | n-$C_4H_9$ | H | 40–41 | $C_{13}H_{19}ClN_2S$ | 57.65 | 7.07 | 10.34 | 57.55 | 7.03 | 10.39 |
| 2, 4 | H | $CH_3$ | H | 106–117 | $C_9H_{10}Cl_2N_2S$ | 43.38 | 4.05 | 11.24 | 43.80 | 4.29 | 11.29 |
| 3, 4 | H | $CH_3$ | H | 134–135 | $C_9H_{10}Cl_2N_2S$ | 43.38 | 4.05 | 11.24 | 43.31 | 4.28 | 11.35 |
| 4 | H | 4-$ClC_6H_4CH_2$ | H | 138–140 | $C_{15}H_{14}Cl_2N_2S$ | 55.39 | 4.34 | 8.61 | 55.69 | 4.68 | 8.62 |

TABLE II.—BROMOBENZYL IODOBENZYL AND FLUOROBENZYL THIOUREA SERIES $XC_6H_4CH_2NR_1CSNR_2R_3$

| Halogen and its position on ring | $R_1$ equals | $R_2$ equals | $R_3$ equals | Melting point, °C. | Molecular formula | Calculated | | | Found | | |
|---|---|---|---|---|---|---|---|---|---|---|---|
| | | | | | | C | H | N | C | H | N |
| F, 2 | H | $CH_3$ | H | 94–95 | $C_9H_{11}FN_2S$ | 54.52 | 5.59 | 14.13 | 54.27 | 5.67 | 13.66 |
| F, 2 | H | $C_2H_5$ | H | 84–85 | $C_{10}H_{13}FN_2S$ | 56.71 | 6.21 | 13.07 | 56.58 | 6.17 | 13.20 |
| Br, 2 | H | $CH_3$ | H | 114–115 | $C_9H_{11}BrN_2S$ | | | | | | |
| Br, 4 | H | $CH_3$ | H | 117–119 | $C_9H_{11}BrN_2S$ | | | 10.81 | | | 10.90 |
| I, 2 | H | $CH_3$ | H | 152–154 | $C_9H_{11}IN_2S$ | | | 9.15 | | | 9.49 |
| Br, 2 | H | $C_2H_5$ | H | 114–116 | $C_{10}H_{13}BrN_2S$ | | | | | | |

TABLE III.—METHYL BENZYL THIOUREA SERIES AND ISOPROPYL BENZYL THIOUREAS $XnC_6H_4CH_2NR_1CSNR_2R_3$

| Position of X on ring (where X is methyl) | $R_1$ equals | $R_2$ equals | $R_3$ equals | Melting point, °C. | Molecular formula | Calculated | | | Found | | |
|---|---|---|---|---|---|---|---|---|---|---|---|
| | | | | | | C | H | N | C | H | N |
| 2 | H | $CH_3$ | H | 135-137 | $C_{10}H_{14}N_2S$ | 61.82 | 7.26 | 14.42 | 61.94 | 7.30 | 14.35 |
| 2 | H | $C_2H_5$ | H | 103-104 | $C_{11}H_{16}N_2S$ | 63.42 | 7.74 | 13.45 | 63.30 | 7.71 | 13.19 |
| 2 | H | n-$C_3H_7$ | H | 40-42 | $C_{12}H_{18}N_2S$ | 64.82 | 8.16 | 12.60 | 65.10 | 8.52 | 12.35 |
| 2 | H | n-$C_4H_9$ | H | 42-44 | $C_{13}H_{20}N_2S$ | 66.05 | 8.53 | 11.85 | 65.75 | 8.40 | 11.56 |
| 2 | H | n-$C_6H_{13}$ | H | 77-78 | $C_{15}H_{24}N_2S$ | 68.13 | 9.15 | 10.59 | 68.45 | 9.17 | 10.48 |
| 2 | H | n-$C_8H_{17}$ | H | 71-73 | $C_{17}H_{28}N_2S$ | 69.81 | 9.65 | 9.58 | 69.34 | 9.80 | 9.30 |
| 2 | H | $CH_3$ | $CH_3$ | 136-137 | $C_{11}H_{16}N_2S$ | 63.42 | 7.74 | 13.45 | 63.43 | 7.68 | 13.53 |
| 3 | H | $CH_3$ | H | 70-71 | $C_{10}H_{14}N_2S$ | 61.82 | 7.26 | 14.42 | 62.08 | 7.35 | 14.51 |
| 4 | H | $CH_3$ | H | 115-116 | $C_{10}H_{14}N_2S$ | 61.82 | 7.26 | 14.42 | 61.60 | 7.07 | 14.29 |
| 4 | H | n-$C_4H_9$ | H | 86-88 | $C_{13}H_{20}N_2S$ | 66.05 | 8.53 | 11.85 | 66.21 | 8.18 | 11.39 |
| 4 | H | n-$C_4H_9$ | n-$C_4H_9$ | 60-61 | $C_{17}H_{28}N_2S$ | 69.81 | 9.65 | | 69.97 | 9.67 | |
| 4 | H | 4-$CH_3C_6H_4CH_2$ | H | 138-140 | $C_{17}H_{20}N_2S$ | 71.79 | 7.09 | 9.85 | 72.21 | 7.02 | 9.90 |
| 4 | H | Allyl | H | 46-49 | $C_{12}H_{16}N_2S$ | 65.41 | 7.32 | 12.71 | 65.53 | 7.44 | 12.50 |
| 3,4 | H | $CH_3$ | H | 60-64 | $C_{11}H_{16}N_2S$ | 63.42 | 7.74 | 13.45 | 63.55 | 7.64 | 13.36 |
| 2,4,5 | H | $CH_3$ | H | 110-113 | $C_{12}H_{18}N_2S$ | 64.82 | 8.16 | 12.60 | 65.21 | 7.96 | 12.33 |
| Position of X on ring (where X is isopropyl) | | | | | | | | | | | |
| 4 | H | $CH_3$ | H | 72-73 | $C_{12}H_{18}N_2S$ | | | 12.60 | | | 12.73 |
| 4 | H | $C_4H_9$ | H | 90-91 | $C_{13}H_{20}N_2S$ | 66.05 | 8.53 | | 66.14 | 8.42 | |
| 4 | H | n-$C_4H_9$ | H | 57-58 | $C_{15}H_{24}N_2S$ | 68.13 | 9.15 | 10.59 | 67.93 | 9.20 | 10.22 |

The anticonvulsant activity of the compounds listed in Tables I to III was determined by administering the compounds intraperitoneally or orally to test animals as a prophylactic against pentylenetetrazol (Met) induced and electro shock seizures (MES).

Some of the more active compounds in the anticonvulsant test are listed in the following table:

| 2-thiourea | MES, $AED_{50}$ (mg./kg.)[1] | Met, $AED_{50}$ (mg./kg.)[1] |
|---|---|---|
| 1-(2-chlorobenzyl)-3-methyl | 31 | 175 |
| 1-(2-chlorobenzyl)-3-ethyl | 35 | 35 |
| 1-(2-fluorobenzyl)-3-methyl | 18 | >400 |
| 1-(2-fluorobenzyl)-3-ethyl | 38 | 67 |
| 1-(2-bromobenzyl)-3-methyl | 38 | 38 |
| 1-(2-methylbenzyl)-3-methyl | 19 | 150 |
| 1-(2-methylbenzyl)-3-ethyl | 37 | 63 |
| 1-(2-methylbenzyl)-3,3-dimethyl | 38 | 300 |

[1] $AED_{50}$ is the approximate quantity of a compound which, when introduced into the test animal, will protect 50% of the animals from the effect.

It thus appears that N-2-halogen or 2-alkylbenzyl thioureas, containing methyl, ethyl or dimethyl on the $N^1$ group show a very high order of activity in the anticonvulsant test.

Suitable dosage forms for the physiological testing of the novel compounds were prepared by either admixing a predetermined amount of the novel compound with a conventional solid pharmaceutical diluent or dissolving the compound in an acceptable parenteral fluid and tableting the mixture. It will, of course, be understood that a wide variety of other dosage forms may be prepared by combining the novel compound with other acceptable pharmaceutical diluents and/or adjuvants.

The anti-mycotic activity of the compounds were determined as follows:

Trays containing 75 ml. Sabouraud's dextrose agar are inoculated with spores from an approximately 30 day culture of *Trichophyton mentagrophytes* or *Microsporum audouini* or with cells from a 24-hour broth culture of *Candida albicans*. Water soluble test compounds are dissolved in 7 pH phosphate buffer while water insoluble compounds are dissolved in a 70% propanol-phosphate buffer mixture. All of the compounds are tested against all 3 organisms at 0.3% concentration. Paper disks saturated with the solutions are placed on the agar surface. The presence of zones of inhibition about the disks are determined after approximately 24 hours or incubation with the trays containing the P-132 culture and after 3-5 days with the trays containing the M-23 and M-25 cultures. Compounds showing zones are later prepared in 0.5% concentrations, and their degrees of activity as compared to nystatin at the same concentrations are computed on a percentage basis. The growth medium in the secondary screening test is fortified with 10% serum.

The 4-chloro and dichlorobenzyl compounds and the 4-alkylbenzyl thioureas proved to be the most effective anti-mycotics.

In general, the compounds containing the short chain alkyl groups are more effective as central nervous system depressants while those having allyl groups of about 4 carbon atoms in the alkyl chain possessed greater anti-mycotic activity.

In the preceding description the term, "lower alkyl" has been used to denote those alkyl groups containing from 1 to 6 carbon atoms while the term, "alkyl" has been used to denote those containing 1 to 8 carbon atoms.

The embodiments of the invention in which an exclusive property or privilege is claimed as follows:

1. An organic thiourea of the formula:

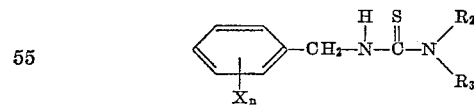

in which X is a member of the group consisting of halogen and lower alkyl group containing 1 to 3 carbon atoms, $n$ is an integer from 1 to 3; $R_2$ is selected from the group consisting of alkyl groups containing 1 to 8 carbon atoms and allyl, and $R_3$ is selected from the group consisting of hydrogen and alkyl groups containing 1 to 6 carbon atoms.

2. 1-(2-chlorobenzyl)-3-methyl-2-thiourea.
3. 1-(3,4-dimethyl benzyl)-3-methyl-2-thiourea.
4. 1-ethyl-3-(4-isopropylbenzyl)-2-thiourea.
5. 1-(2-bromobenzyl)-3-methyl-2-thiourea.
6. 1-(2-methylbenzyl)-3-methyl-2-thiourea.
7. 1-(2-fluorobenzyl)-3-methyl-2-thiourea.
8. 1-(2-chlorobenzyl)-3,3-dimethyl-2-thiourea.
9. 1-(4-chlorobenzyl)-1,3-dimethyl-2-thiourea.
10. 1-allyl-3(4-chlorobenzyl)-2-thiourea.

(References on following page)

References Cited in the file of this patent

UNITED STATES PATENTS

| | | |
|---|---|---|
| 2,285,184 | Bousquet et al. | June 2, 1942 |
| 2,336,464 | Buck et al. | Dec. 14, 1943 |
| 2,967,101 | Hamm et al. | Jan. 13, 1961 |

OTHER REFERENCES

De Beer et al.: J. Pharmacology, volume 57 (1936), pages 22 and 27 particularly relied on.

Shah et al.: J. Indian Chem. Soc., volume 33 (1956), pages 423–4.

Singh: J. Indian Chem., volume 33 (1956), pages 610–2.

Trivedi et al.: J. Indian Chem Soc., volume 35 (1958), pages 657–60.

Trivedi et al.: J. Indian Chem. Soc., volume 35 (1958), pages 661–4.